(12) United States Patent
Lesso et al.

(10) Patent No.: US 10,818,298 B2
(45) Date of Patent: Oct. 27, 2020

(54) AUDIO PROCESSING

(71) Applicant: Cirrus Logic International Semiconductor Ltd., Edinburgh (GB)

(72) Inventors: John Paul Lesso, Edinburgh (GB); Gordon Richard McLeod, West Lothian (GB)

(73) Assignee: Cirrus Logic, Inc., Austin, TX (US)

( * ) Notice: Subject to any disclaimer, the term of this patent is extended or adjusted under 35 U.S.C. 154(b) by 6 days.

(21) Appl. No.: 16/188,642

(22) Filed: Nov. 13, 2018

(65) Prior Publication Data

US 2019/0147887 A1   May 16, 2019

Related U.S. Application Data

(60) Provisional application No. 62/585,646, filed on Nov. 14, 2017.

(30) Foreign Application Priority Data

Feb. 6, 2018 (GB) .................................. 1801875.4

(51) Int. Cl.
*G10L 17/04* (2013.01)
*G10L 25/51* (2013.01)
*G10L 17/02* (2013.01)
*G10L 25/45* (2013.01)

(52) U.S. Cl.
CPC .............. *G10L 17/04* (2013.01); *G10L 17/02* (2013.01); *G10L 25/45* (2013.01); *G10L 25/51* (2013.01)

(58) Field of Classification Search
CPC ...................................... G10L 17/06
USPC ........................................................ 704/246
See application file for complete search history.

(56) References Cited

U.S. PATENT DOCUMENTS

| | | | | |
|---|---|---|---|---|
| 4,292,471 A * | 9/1981 | Kuhn | ...................... | G07C 9/257 704/238 |
| 5,522,012 A * | 5/1996 | Mammone | ............... | G10L 17/02 704/231 |
| 5,893,057 A * | 4/1999 | Fujimoto | ................ | G10L 17/00 704/246 |
| 6,411,933 B1 * | 6/2002 | Maes | .................. | G06K 9/00892 704/273 |
| 7,039,951 B1 * | 5/2006 | Chaudhari | .............. | G10L 17/06 340/5.84 |
| 8,615,393 B2 * | 12/2013 | Tashev | .................. | G10L 15/065 704/226 |

(Continued)

FOREIGN PATENT DOCUMENTS

CN    102486922 B    12/2014

OTHER PUBLICATIONS

Combined Search and Examination Report under Sections 17 and 18(3), UKIPO, Application No. 1801875.4, dated Jul. 26, 2018.

(Continued)

*Primary Examiner* — Huyen X Vo
*Assistant Examiner* — Timothy Nguyen
(74) *Attorney, Agent, or Firm* — Jackson Walker L.L.P.

(57) ABSTRACT

A method of audio processing comprises receiving an audio signal. A plurality of framed versions of the received audio signal are formed, each of the framed versions having a respective frame start position. One of the plurality of framed versions of the received audio signal is selected. The selected one of the plurality of framed versions of the received audio signal is used in a subsequent process.

14 Claims, 7 Drawing Sheets

(56) References Cited

U.S. PATENT DOCUMENTS

| | | | |
|---|---|---|---|
| 9,596,578 B1 | 3/2017 | Clark et al. | |
| 2007/0100620 A1* | 5/2007 | Tavares | G10L 17/06 |
| | | | 704/246 |
| 2008/0059169 A1* | 3/2008 | Shi | G10L 25/87 |
| | | | 704/233 |
| 2008/0114593 A1* | 5/2008 | Tashev | G10L 15/065 |
| | | | 704/226 |
| 2008/0225651 A1 | 9/2008 | Waites | |
| 2011/0153321 A1* | 6/2011 | Allen | G10L 21/0364 |
| | | | 704/226 |
| 2012/0253807 A1* | 10/2012 | Kamano | G10L 25/63 |
| | | | 704/240 |
| 2014/0278391 A1* | 9/2014 | Braho | G10L 25/78 |
| | | | 704/233 |
| 2015/0066494 A1* | 3/2015 | Salvador | H04L 1/1874 |
| | | | 704/224 |
| 2018/0084280 A1* | 3/2018 | Thiagarajan | H04N 19/176 |
| 2019/0318745 A1* | 10/2019 | Lesso | G10L 25/84 |

OTHER PUBLICATIONS

International Search Report and Written Opinion of the International Searching Authority, International Application No. PCT/GB2018/053275, dated Feb. 12, 2019.

\* cited by examiner

AUDIO PROCESSING

TECHNICAL FIELD

Embodiments described herein relate to methods and devices for audio processing.

BACKGROUND

Many devices contain audio processing systems. A large number of audio processing systems are particularly concerned with speech processing, for example for the purposes of speaker recognition (either in the form of speaker identification or speaker verification) or speech recognition, that is, determining the content of the speech.

SUMMARY

Typically, a speech processing system will receive a signal representing sound, and will divide the signal into frames of a fixed length. The content of these frames is then analysed. A voice activity detector (VAD) is often used to identify frames that contain speech, so that only those frames are used in the speech processing system.

However, it is now recognised that the use of the VAD may mean that the frame in which the start of the speech occurs may not be recognised as containing speech.

Moreover, it is now recognised that, when the length of a frame is close to a characteristic period (for example the Glottal Pulse Period) of the speaker's speech, attempts to perform speech processing on that speaker's speech are prone to a higher than normal error rate.

According to an aspect of the present invention, there is provided a method of audio processing, comprising:
  receiving an audio signal;
  forming a plurality of framed versions of the received audio signal, each of the framed versions having a respective frame start position;
  selecting one of the plurality of framed versions of the received audio signal; and
  using the selected one of the plurality of framed versions of the received audio signal in a subsequent process.

According to another aspect of the present invention, there is provided a system for audio processing, configured for operating in accordance with the method.

According to another aspect of the present invention, there is provided a device comprising such a system. The device may comprise a mobile telephone, an audio player, a video player, a mobile computing platform, a games device, a remote controller device, a toy, a machine, or a home automation controller or a domestic appliance.

According to another aspect of the present invention, there is provided a computer program product, comprising a computer-readable tangible medium, and instructions for performing a method according to the first aspect.

According to another aspect of the present invention, there is provided a non-transitory computer readable storage medium having computer-executable instructions stored thereon that, when executed by processor circuitry, cause the processor circuitry to perform a method according to the first aspect.

BRIEF DESCRIPTION OF DRAWINGS

For a better understanding of the present invention, and to show how it may be put into effect, reference will now be made to the accompanying drawings, in which:—

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems, for example a mobile telephone, an audio player, a video player, a mobile computing platform, a games device, a remote controller device, a toy, a machine, or a home automation controller or a domestic appliance. However, for ease of explanation of one embodiment, an illustrative example will be described, in which the implementation occurs in a smartphone.

Figure 1:
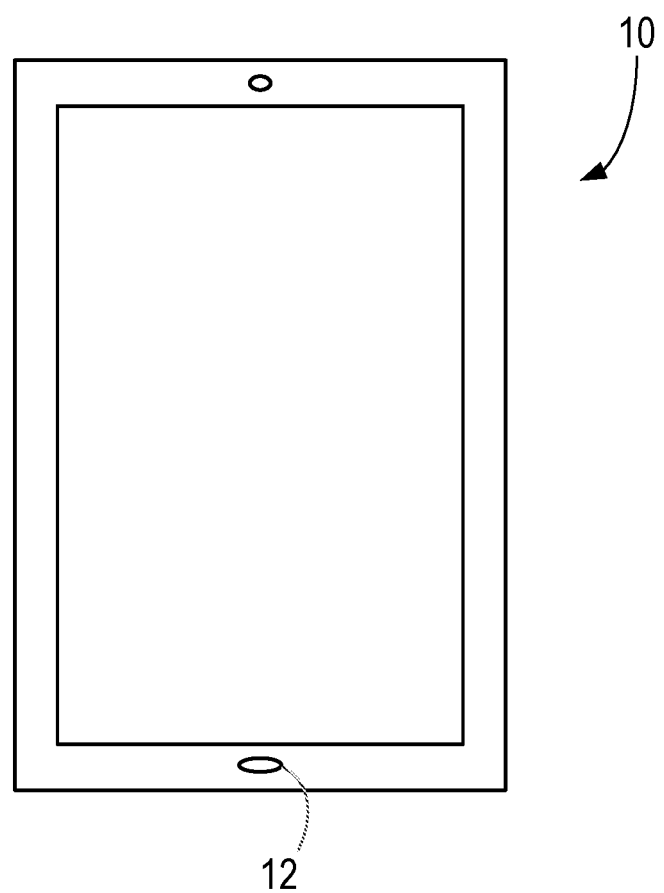
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10 close to their face.

Figure 2:
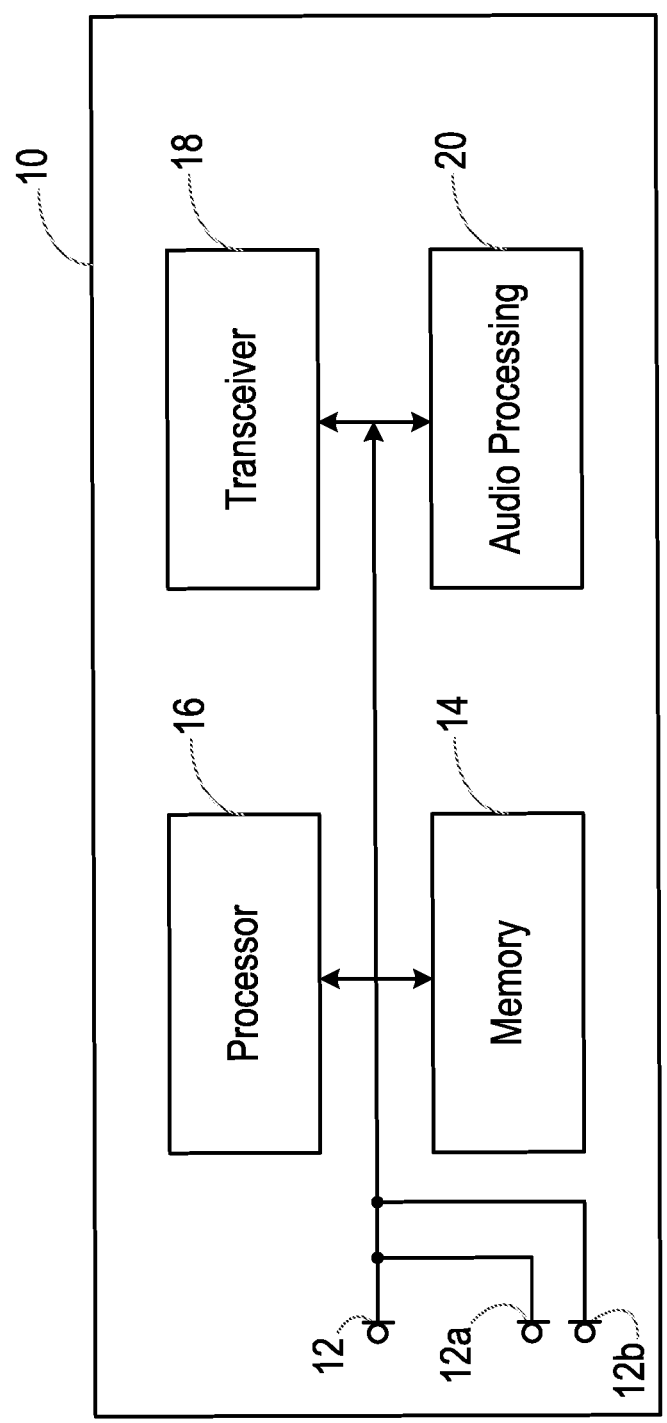
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

In other embodiments, the speech recognition is also performed on the smartphone 10.

Embodiments of the invention may be used in a variety of audio processing systems, including speech processing systems. Described below are embodiments for use in a speaker recognition system.

Figure 3:
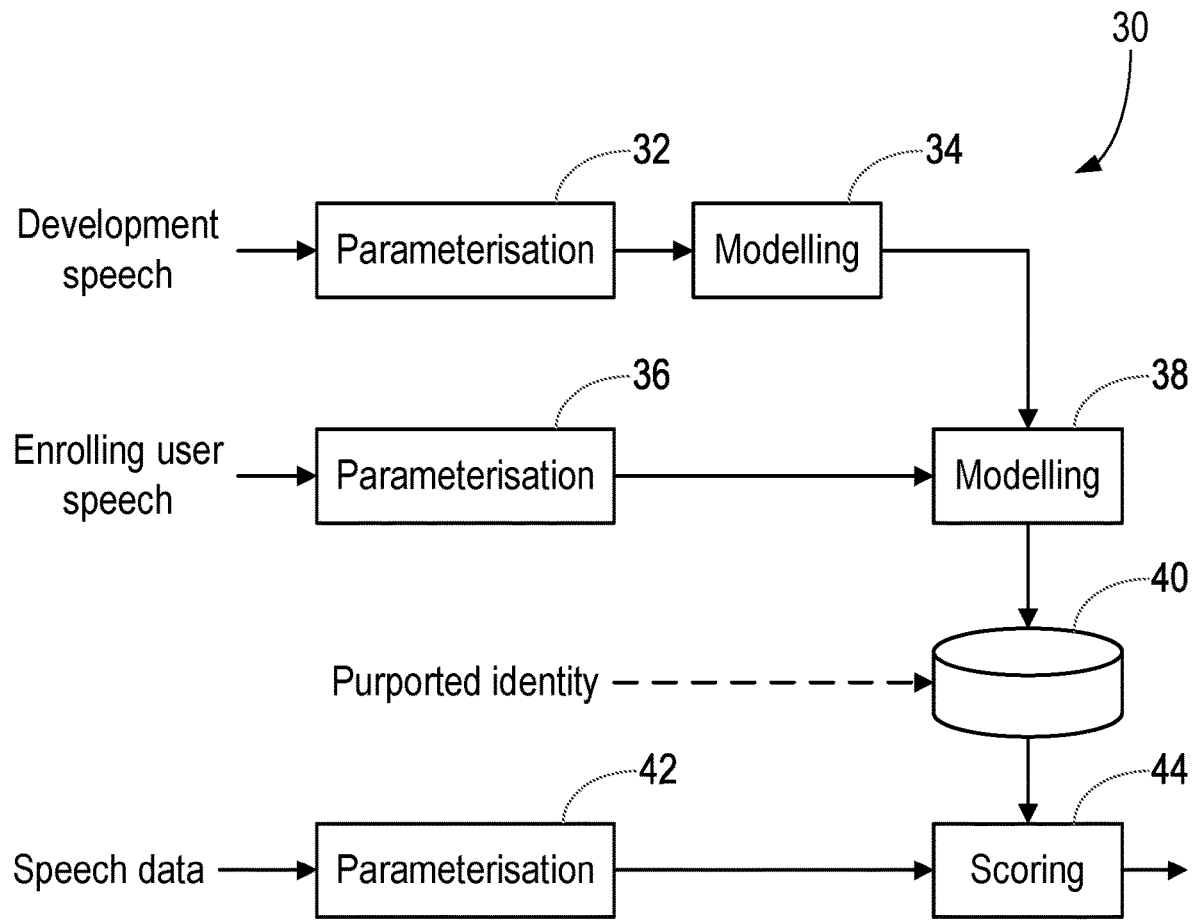
FIG. 3 illustrates a speech processing system.

FIG. 3 is a block diagram illustrating the basic form of a speaker recognition system.

A typical speaker recognition system 30 uses a background model, for example a Universal Background Model (UBM), that is based on the speech of a large number of people. This speech, referred to as development speech, is passed to a parameterisation block 32, in which features of the speech are obtained.

These features are passed to a modelling block 34, which forms a background model.

When a user wishes to enroll in the speaker recognition system, they speak into a microphone, and the speech of the enrolling user is passed to a second parameterisation block 36, in which features of the speech are obtained. The second parameterisation block 36 may obtain the same features as the parameterisation block 32.

The features obtained by the second parameterisation block 36 are passed to a second modelling block 38, which forms a model of the user's speech, also referred to as a voice print. This takes account of the background model formed by the modelling block 34, so that the model of the user's speech contains features that help to distinguish that user from other speakers.

The model of the enrolling user's speech, formed by the modelling block 38, is stored in a database 40.

The speaker recognition system 30 may be used for speaker identification and/or speaker verification.

In the case of speaker verification, a speaker provides an indication of their identity as an enrolled user, either explicitly or implicitly. This is used to select the model of that enrolled user's speech.

Speech data from that speaker is passed to a third parameterisation block 42, in which features of the speech are obtained. The third parameterisation block 42 may obtain the same features as the parameterisation block 32.

The features obtained by the third parameterisation block 42 are passed to a scoring block 44. The scoring block 44 compares the features obtained by the third parameterisation block 42 with the model of the purported speaker's speech, and determines whether the similarity is enough to conclude, to a degree of certainty that is appropriate to the required level of security of the system, that the speaker is indeed who they claim to be.

In the case of speaker identification, there is no indication of the identity of a speaker.

Speech data from the speaker is again passed to the third parameterisation block 42, in which features of the speech are obtained.

The features obtained by the third parameterisation block 42 are passed to the scoring block 44. In this case, the scoring block 44 compares the features obtained by the third parameterisation block 42 with the models of each enrolled speaker's speech, and determines which of those enrolled speakers is most likely to have been the speaker.

Where the speaker recognition system 30 is intended to be used in a device such as the smartphone 10, or any other consumer device, it is likely that the parameterisation block 32 and the modelling block 34 will not be provided in the smartphone 10, which will instead be provided with the background model.

In the case of a smartphone, home automation controller or the like, the speaker recognition system may rely on the user speaking a predetermined trigger phrase, such as "Hello phone", to wake up the system. In that case, the user may be requested to speak that phrase when enrolling. Further, the verification system may be activated only when a trigger phrase detection module determines that the predetermined trigger phrase has been spoken.

Figure 4:
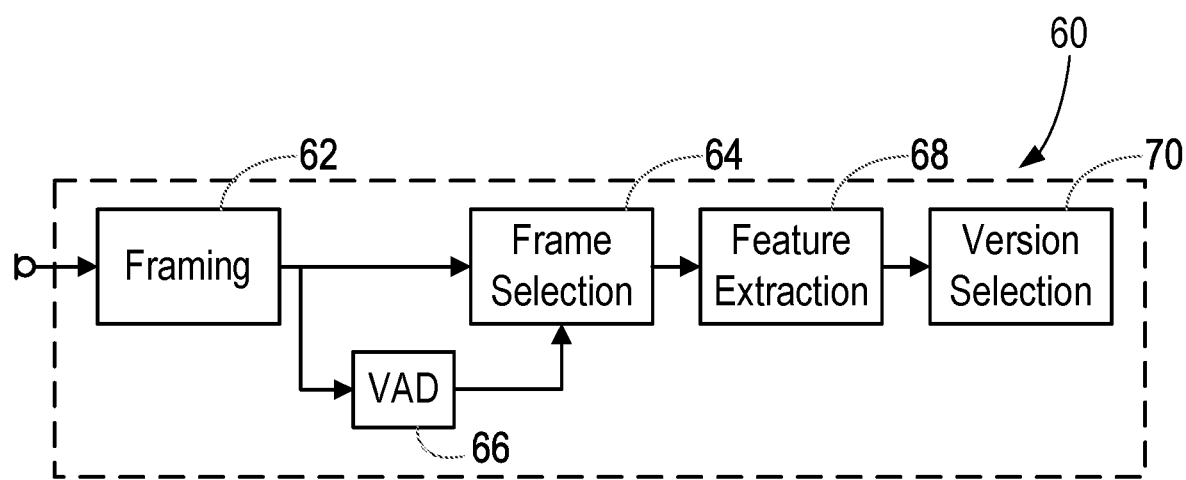
FIG. 4 illustrates a part of the speech processing system of FIG. 3.

FIG. 4 is a block diagram, illustrating in more detail the form of a parameterisation block 60. The structure shown in FIG. 4 can be used in the parameterisation block 32 as part of the process of generating a background model, and/or in the second parameterisation block 36 as part of the process of user enrolment, and/or in the third parameterisation block 42 as part of the process of speaker recognition.

Figure 5:
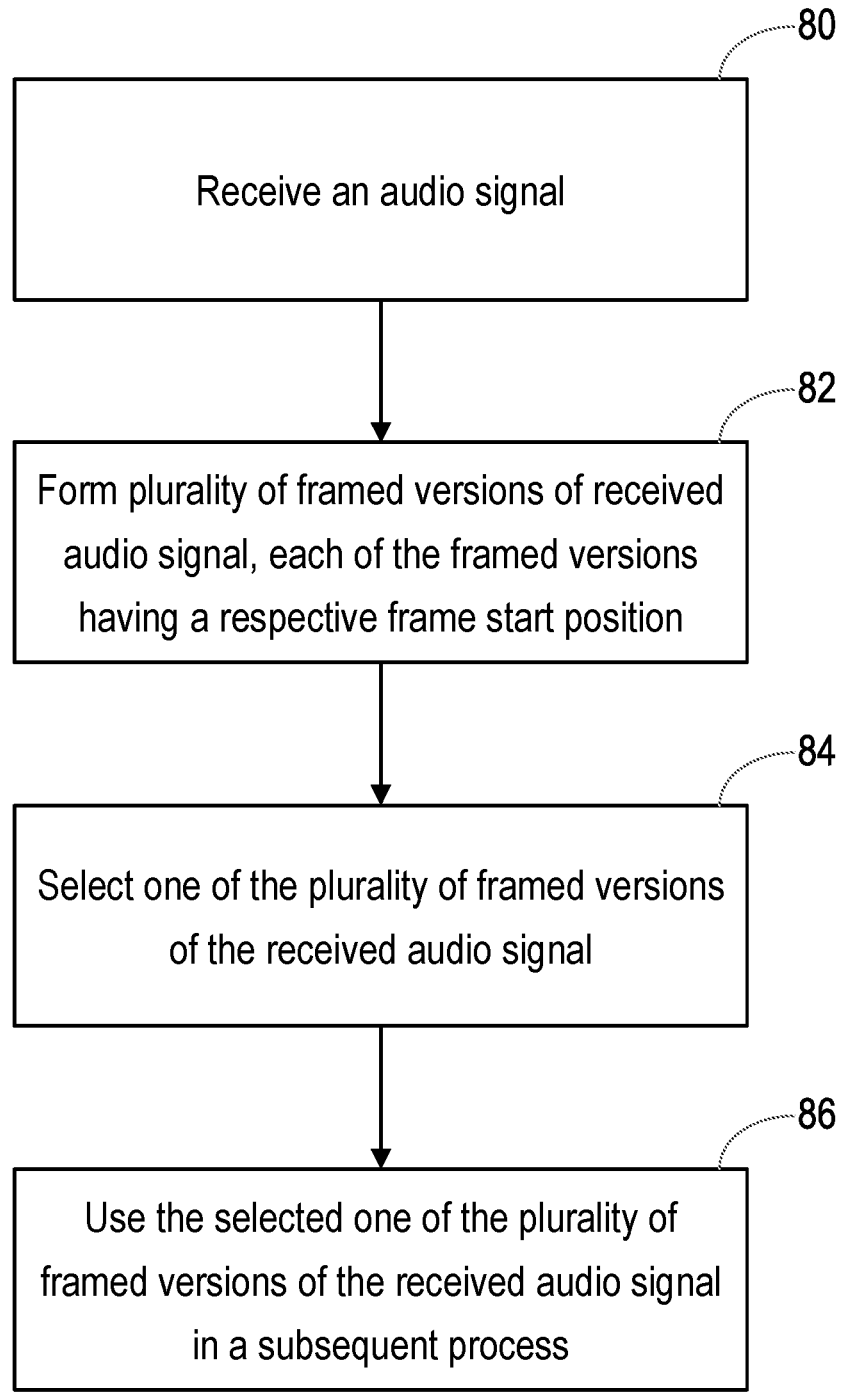
FIG. 5 is a flow chart illustrating a method of handling an audio signal.

FIG. 5 is a flow chart, illustrating a method of processing an audio signal.

A microphone 12 detects sound and, in step 80 of the method of FIG. 5, the parameterisation block 60 receives the audio signal from the microphone.

In step 82, the received audio signal is passed to a framing block 62, which forms a plurality of framed versions of the received audio signal, each of the framed versions having a respective frame start position.

Figure 6:
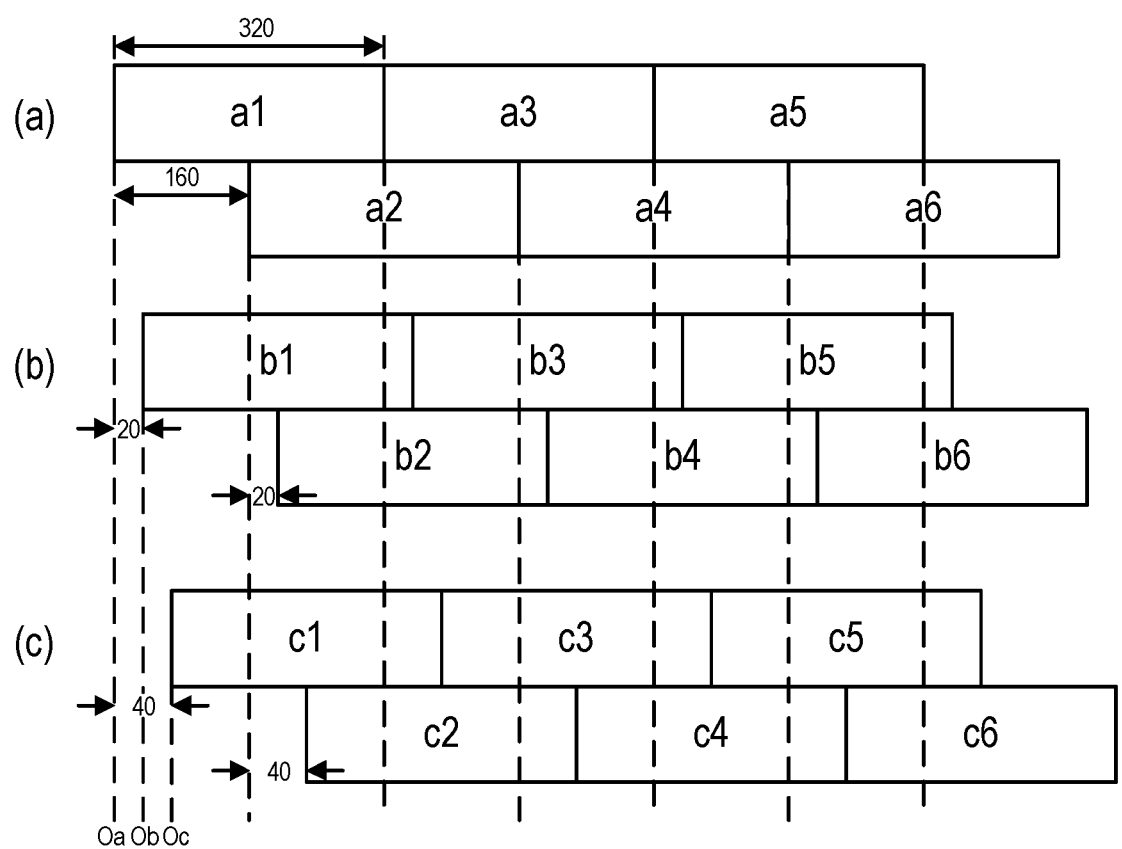
FIG. 6 illustrates a part of the method of FIG. 5.

FIG. 6 illustrates the formation of the plurality of framed versions of the received audio signal.

In this illustrated example, each frame consists of 320 samples of data (with a duration of 20 ms). Further, each frame overlaps the preceding frame by 50%.

FIG. 6(a) shows a first one of the framed versions of the received audio signal. Thus, as shown in FIG. 6(a), a first frame a1 has a length of 320 samples, a second frame a2 starts 160 samples after the first frame, a third frame a3 starts 160 samples after the second (i.e. at the end of the first frame), and so on for the fourth frame a4, the fifth frame a5, and the sixth frame a6, etc.

The start of the first frame a1 in this first framed version is at the frame start position 0a.

As shown in FIG. 6(b), again in this illustrated example, each frame consists of 320 samples of data (with a duration of 20 ms). Further, each frame overlaps the preceding frame by 50%.

FIG. 6(b) shows another of the framed versions of the received audio signal. Thus, as shown in FIG. 6(b), a first frame b1 has a length of 320 samples, a second frame b2 starts 160 samples after the first frame, a third frame b3 starts 160 samples after the second (i.e. at the end of the first frame), and so on for the fourth frame b4, the fifth frame b5, and the sixth frame b6, etc.

The start of the first frame b1 in this second framed version is at the frame start position Ob, and this is offset from the frame start position Oa of the first framed version by 20 sample periods.

As shown in FIG. 6(c), again in this illustrated example, each frame consists of 320 samples of data (with a duration of about 6.66 ms). Further, each frame overlaps the preceding frame by 50%.

FIG. 6(c) shows another of the framed versions of the received audio signal. Thus, as shown in FIG. 6(c), a first frame c1 has a length of 320 samples, a second frame c2 starts 160 samples after the first frame, a third frame c3 starts 160 samples after the second (i.e. at the end of the first frame), and so on for the fourth frame c4, the fifth frame c5, and the sixth frame c6, etc.

The start of the first frame c1 in this third framed version is at the frame start position Oc, and this is offset from the frame start position Ob of the second framed version by a further 20 sample periods, i.e. it is offset from the frame start position Oa of the first framed version by 40 sample periods.

In this example, three framed versions of the received signal are illustrated. It will be appreciated that, with a separation of 160 sample periods between the start positions of successive frames, and an offset of 20 sample periods between different framed versions, eight framed versions can be formed.

In other examples, the offset between different framed versions can be any desired value. For example, with an offset of two sample periods between different framed versions, 80 framed versions can be formed; with an offset of four sample periods between different framed versions, 40 framed versions can be formed; with an offset of five sample periods between different framed versions, 32 framed versions can be formed; with an offset of eight sample periods between different framed versions, 20 framed versions can be formed; or with an offset of 10 sample periods between different framed versions, 16 framed versions can be formed.

In other examples, the offset between each adjacent pair of different framed versions need not be exactly the same. For example, with some of the offsets being 26 sample periods and other offsets being 27 sample periods, six framed versions can be formed.

The number of versions that is formed should be the same for each received audio signal.

The received audio signal is then passed, in the different framed versions, to a frame selection block 64.

The output of the framing block 62 is also passed to a voice activity detection (VAD) block 66.

The VAD 66 attempts to detect the presence of speech in each frame of the received signal, in each of its different framed versions, and sends a control signal to the frame selection block 64, so that only those frames that contain speech are considered further. If necessary, the data passed to the frame selection block 64 may be passed through a buffer, so that the frame that contains the start of the speech will be recognised as containing speech.

As shown in step 84 of the method of FIG. 5, one of the plurality of framed versions of the received audio signal is selected.

As shown at step 86, that selected one of the plurality of framed versions of the received audio signal is subsequently used in a subsequent process, for example a biometric process, such as a Universal Background Model (UBM) generation process, an enrolment process, or a verification process, as described previously.

In this illustrated example, the step of selecting one of the plurality of framed versions, set out in step 84 of the method of FIG. 5, comprises passing the frames that contain speech, in each of the plurality of framed versions, to a feature extraction block 68. The extracted features are then passed to a version selection block 70.

Since there is an overlap between the frames in each version, and also a further overlap between the frames in one framed version and in each other framed version, the data making up the frames may be buffered as appropriate, so that the calculations described below can be performed on each frame of the relevant framed versions, with the minimum of delay.

More specifically, in illustrated embodiments, the step of selecting one of the plurality of framed versions comprises identifying one of the plurality of framed versions of the received audio signal as a most typical or most representative version, and then selecting that most typical or most representative version.

This has the effect that the robustness of the system is increased. For example, if this method is used during the enrolment process, and a highly representative framed version of the user's speech is selected and used for generating a speaker model, there is an improved probability that the version of the speech that is used during verification will correctly be recognised as a match for the model.

By contrast, if this method is not used, there is a possibility that a highly unrepresentative framed version of the user's speech will be used to form the speaker model, leading to the risk that the user's speech when received during verification will not be recognised as a match for the model.

Similarly, if this method is used during the verification process, and a highly representative framed version of the user's speech is used for comparison with the speaker model, there is an improved probability that the version of the speech that is used during verification will correctly be recognised as a match for the model.

By contrast, if this method is not used, there is a possibility that a highly unrepresentative framed version of the user's speech will be compared with the speaker model, leading to the risk that that version of the speech will not be recognised as a match for the model.

The most typical or most representative framed version is found by determining how different the reframed sets are from each other.

In some embodiments, identifying one of the plurality of framed versions of the received audio signal as a most typical or most representative version comprises selecting one of the plurality of framed versions of the received audio signal as a reference version; and comparing other framed versions of the received audio signal with the reference version. The selection of the reference version may be arbitrary.

Then, identifying one of the plurality of framed versions of the received audio signal as a most typical or most representative version may comprise calculating a respective value of an error between each of the other framed versions of the received audio signal and the reference version. One of the other framed versions having an average value of the error is then identified as the most representative version.

In other examples, two framed versions may be chosen as reference versions, and the most typical or most representative version may be found by calculating an error value for each of the other framed versions, taking account of the errors from each of the two reference versions.

In still further examples, each of the framed versions may be compared against each other framed version, with one of the framed versions being selected as the most representative, based on the errors between the different framed versions.

In each of these examples, the respective values of the error may be calculated by extracting features from each of the framed versions of the received audio signal in the feature extraction block 68 shown in FIG. 4.

The feature extraction block 68 compresses the information in a frame to F values, which may for example be Mel-Frequency Cepstral Coefficients (MFCC) or other features that are used in speech processing systems (and where F may for example be a number in the region of 20 values per frame). Where the audio signal has a length of L frames (where L may for example be in the region of 10 frames), the feature extraction block 68 obtains an array of F*L features per received audio signal.

One such array of F*L features is obtained for each of the framed versions of the received audio signal.

Then, with one of the versions having been selected as the reference version, a value of the error may be calculated for each of the other versions. Specifically, this value of the error may be formed by calculating an error between features of the respective other framed version of the received audio signal and features of the reference version.

The error between the features may be determined in different ways, such as the Root Mean Square (RMS) error, sum of absolute error, or sum of difference, but in one example the measure of the error that is used is the Mean Square Error (MSE) between the features of the respective framed version and the reference framed version.

Another error metric that can be used is the number of frames passed by the VAD as containing speech. That is, as the frame start points are shifted, some shifts will identify more frames as containing speech because of the better framing of the audio for the VAD.

The version selection block 70 in FIG. 4 then selects one of the other framed versions of the received signal.

The process of selecting one of the other framed versions of the received signal may for example be performed by obtaining the error measure (for example the MSE) for each of the other framed versions, and selecting the framed version having a median value of the error as the identified most representative version.

Alternatively, the process may be performed by selecting the framed version having a mode value of the error as the identified most representative version.

Figure 7A:
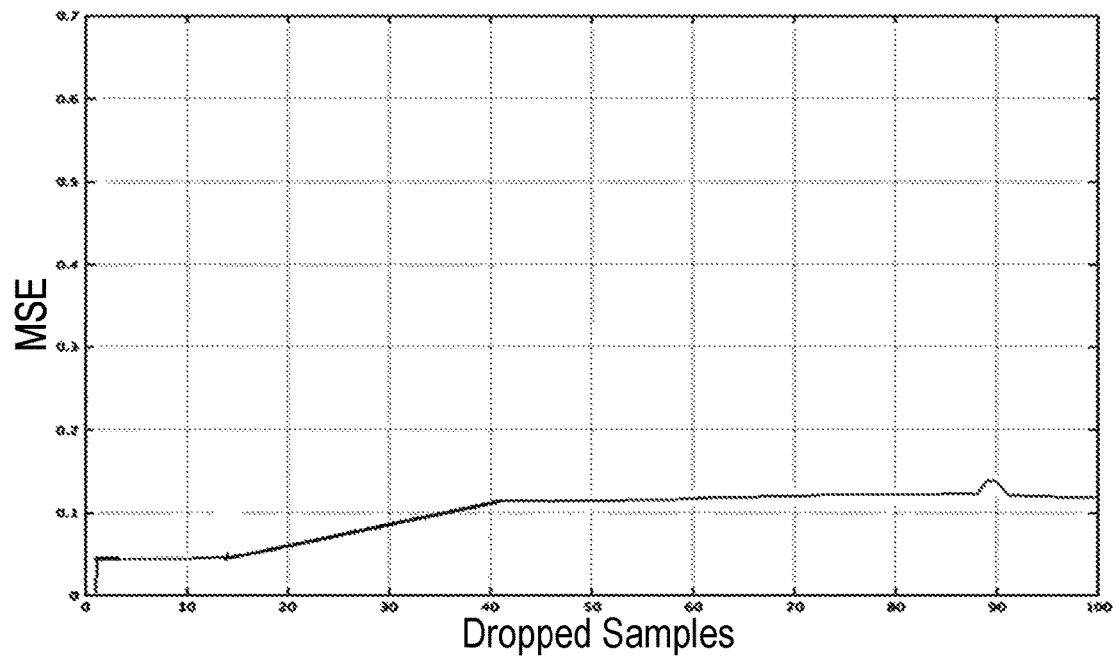
FIG. 7(a) illustrates a first result of performing the method of FIG. 5.
Figure 7B:
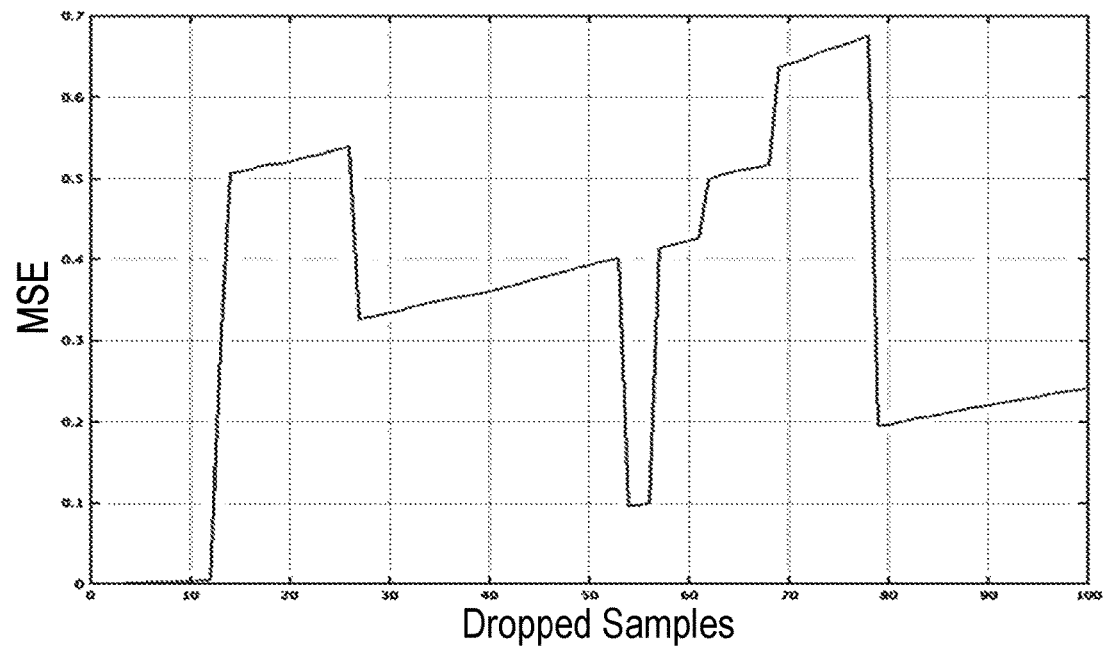
FIG. 7(b) illustrates a second result of performing the method of FIG. 5.

As an example of the operation of the process, reference is made to FIGS. 7(a) and 7(b).

FIGS. 7(a) and 7(b) illustrate plots of MSE values calculated for a range of shifted frame versions, the MSE calculated with regard to an arbitrary reference frame, with the amount by which the framed versions are shifted plotted on the X-axis (in the form of the number of samples dropped or shifted relative to the reference frame). While FIGS. 7(a) and 7(b) show the calculations performed for 100 different versions of the reference frames, it will be understood that different numbers or configurations of frame shifting may be performed.

FIG. 7(a) illustrates the variation in MSE over frame shifts for speech from a human speaker, where the speech has a relatively low sensitivity to framing. In this case, it can be seen that the MSE does not significantly vary based on the framing, with the majority of frame positions producing a relatively low MSE of between approximately 0.05-0.11 from the selected reference frame. As a result, the process will select a frame version having an MSE value falling somewhere within this range, as such a frame version will be a typical or highly representative version of that speaker's speech.

By contrast, FIG. 7(b) illustrates the variation in MSE over frame shifts for speech from a human speaker, where the speech has relatively high sensitivity to framing. In this case, the MSE can be seen to vary relatively dramatically based on the frame position. For such speech, the process will select a frame version having a shifted position with a mode or median MSE value (in this case, this may be somewhere in the approximate range 0.3-0.5). The selection of such a frame version should result in the selected framing for the received speech being a generally more representative version of the speaker's speech, at least when compared with shifted versions of the speech which are more "extreme" or "non-typical". (For the versions shown in FIG. 7(b), such "non-typical" versions may be those versions with an MSE of greater than 0.5 or less than 0.3.)

Having made the selection, it is this selected framed version that is used in a subsequent process, as indicated in step 86 of the method of FIG. 5. For example, it is this framed version that might be used in an enrolment process, or in a speaker verification process.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of audio processing, comprising:
   receiving an audio signal;
   forming a plurality of framed versions of the received audio signal, wherein each of the framed versions comprises said received audio signal divided into a plurality of frames, wherein each of the framed versions has a respective frame start position, and wherein each of said frame start positions is a different position within a duration of one frame;
   selecting one of the plurality of framed versions of the received audio signal; and
   using the selected one of the plurality of framed versions of the received audio signal in a subsequent biometric process.

2. A method according to claim 1, comprising:
   identifying one of the plurality of framed versions of the received audio signal as a most representative version; and
   selecting the identified most representative version as said selected one of the plurality of framed versions of the received audio signal.

3. A method according to claim 2, wherein identifying one of the plurality of framed versions of the received audio signal as a most representative version comprises:
   selecting one of the plurality of framed versions of the received audio signal as a reference version; and
   comparing other framed versions of the received audio signal with the reference version.

4. A method according to claim 3, further comprising:
   calculating a respective value of an error between each of said other framed versions of the received audio signal and the reference version; and
   selecting one of said other framed versions having an average value of the error as the identified most representative version.

5. A method according to claim 4, wherein calculating the respective value of the error between each of said other framed versions of the received audio signal and the reference version comprises:
   extracting features from each of said other framed versions of the received audio signal and from the reference version; and
   calculating the respective value of the error by calculating an error between features of the respective other framed version of the received audio signal and features of the reference version.

6. A method according to claim 4, wherein the respective value of the error comprises a Mean Square Error value.

7. A method according to claim 4, comprising selecting one of said other framed versions having a median value of the error as the identified most representative version.

8. A method according to claim 4, comprising selecting one of said other framed versions having a mode value of the error as the identified most representative version.

9. A method according to claim 1, comprising receiving the audio signal from a voice activity detector.

10. A method according to claim 1, wherein the biometric process is a speaker enrolment process.

11. A method according to claim 1, wherein the biometric process is a speaker verification process.

12. A method according to claim 1, wherein the biometric process is a Universal Background Model (UBM) generation process.

13. A system for audio processing, the system comprising an input for receiving an audio signal; and a processor, and the system being configured for:
    receiving the audio signal;
    forming a plurality of framed versions of the received audio signal, wherein each of the framed versions comprises said received audio signal divided into a plurality of frames, wherein each of the framed versions has a respective frame start position, and wherein each of said frame start positions is a different position within a duration of one frame;
    selecting one of the plurality of framed versions of the received audio signal; and
    using the selected one of the plurality of framed versions of the received audio signal in a subsequent biometric process.

14. A non-transitory computer readable storage medium having computer-executable instructions stored thereon that, when executed by processor circuitry, cause the processor circuitry to perform a method comprising:
    receiving an audio signal;
    forming a plurality of framed versions of the received audio signal, wherein each of the framed versions comprises said received audio signal divided into a plurality of frames, wherein each of the framed versions has a respective frame start position, and wherein each of said frame start positions is a different position within a duration of one frame;
    selecting one of the plurality of framed versions of the received audio signal; and
    using the selected one of the plurality of framed versions of the received audio signal in a subsequent biometric process.

* * * * *